United States Patent Office 3,452,468
Patented July 1, 1969

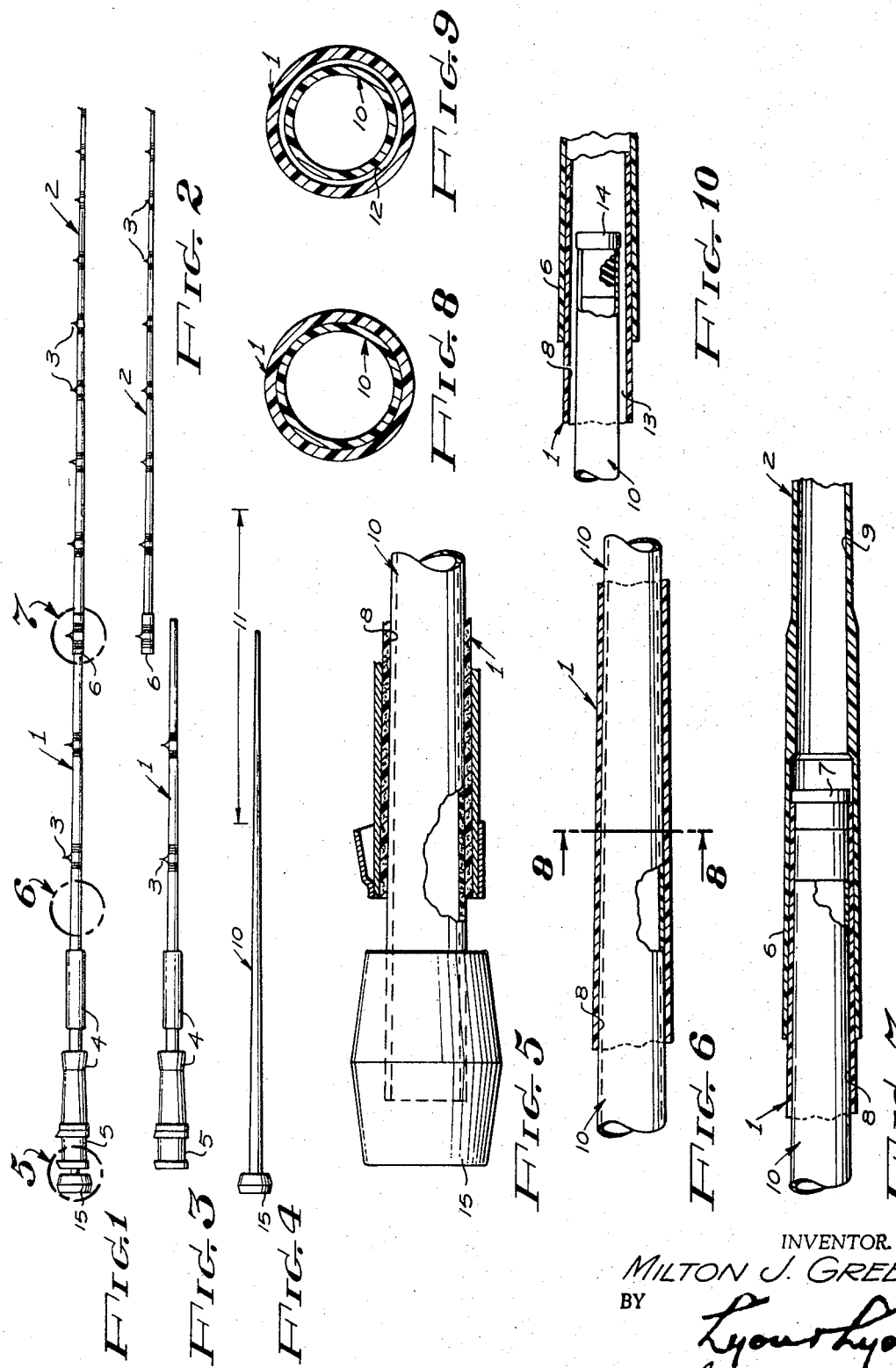

3,452,468
FISHING ROD WITH REMOVABLE STIFFENER
Milton J. Green, Long Beach, Calif., assignor to Fenwick Products Inc., Long Beach, Calif., a corporation of Washington
Filed Nov. 25, 1966, Ser. No. 596,955
Int. Cl. A01k 87/00, 87/02
U.S. Cl. 43—18          8 Claims

ABSTRACT OF THE DISCLOSURE

A fishing rod open at its butt end and having a tapered bore in which fits a flexible, tapered, stiffening rod. The stiffening rod has a handle and the rod extends approximately half the length of the fishing rod. The stiffening rod is removable from or insertable within the bore at the butt end while the fishing rod is in use.

---

First, to provide a fishing rod which may have the flexibility and action of a fly casting rod; yet when desired, may be stiffened; thereby enhancing the sport of fishing by permitting fly casting for large fish, particularly ocean fish, then when the fish is hooked the fishing rod may be stiffened to permit its use in playing and taking a fish which would be too large for the rod in its initial condition.

Second, to provide a fishing rod in the form of a hollow tapered tube, in which is removably fitted a tapered reinforcing member insertable into the butt end of the fishing rod, both the reinforcing rod and the fishing rod having a progressively increasing stiffness from their tip ends toward their butt ends.

With the above and other objects in view, as may appear hereinafter, reference is directed to the accompanying drawings in which:

FIGURE 1 is a side view of the assembled fishing rod, the transverse scale being substantially greater than the longitudinal scale, in order to clarify the illustration.

FIGURE 2 is a similar side view of the tip section of the fishing rod.

FIGURE 3 is a similar side view of the butt section of the fishing rod.

FIGURE 4 is a similar side view of the stiffening rod removed from the butt section of the fishing rod.

FIGURE 5 is an enlarged fragmentary sectional view taken within circle 5 of FIGURE 1.

FIGURE 6 is an enlarged fragmentary sectional view taken within circle 6 of FIGURE 1.

FIGURE 7 is an enlarged fragmentary sectional view taken within circle 7 of FIGURE 1.

FIGURE 8 is a further enlarged transverse sectional view taken through 8—8 of FIGURE 6.

FIGURE 9 is a similar transverse sectional view showing a modified construction.

FIGURE 10 is a fragmentary sectional view corresponding to FIGURE 7 showing another modified construction.

The fishing rod, as illustrated, comprises a butt section 1 and a tip section 2. However, the fishing rod may be made in one section or may comprise more than two sections. The fishing rod sections are essentially conventional and are formed of fiber glass, which in the construction of the fishing rod, is wrapped about a suitable mandrel and is impregnated as well as coated with a suitable resin. The fishing rod is provided with conventional line guides 3 and grips 4, and reel seat 5.

The butt end of the tip section is provided with a ferrule 6, which receives the tip end of the butt section 1, as shown in FIGURE 7. The tip end of the butt section may be provided with a plug 7.

The mandrels on which the sections 1 and 2 are formed are tapered so that each section has a tapered bore, designated 8 and 9 respectively.

The tapered bore 8 is adapted to receive a stiffening rod 10, which is externally tapered to conform to the tapered bore 8. The stiffening rod is formed of fiber glass and resin in the same manner as the fishing rod sections 1 and 2. The stiffening rod is preferably approximately the length of the butt section 1 so that the tip section of the stiffening rod is located within the ferrule 6, as shown in FIGURE 7. However, if the plug 7 is omitted, the stiffening rod may extend into the tip section 2. Also, if desired, the stiffening rod may occupy only a portion of the length of the butt section. In other words, the tip extremity of the stiffening rod may lie within the range designated 11, indicated in FIGURE 4. It is a conventional practice to form the fishing rod sections so that the wall thickness increases at some predetermined rate, which may be constant or variable, so that the stiffness of the rod at any point meets a predetermined condition. In any case, the stiffness increases toward the butt end of each fishing rod section. Similarly, the wall thickness of the stiffening rod is increased from its tip end toward its butt end. It is desirable that the stiffening rod be relatively flexible at its tip end so that when inserted in the butt section 1, there will not be a significant stress concentration at the tip end of the stiffening rod. This condition is further minimized by terminating the stiffening rod within the ferrule 6.

While it is preferred that the stiffening rod bear against the walls of the butt section throughout its length, the relative tapers of the bore 8 and the stiffening rod may be such that the central portion of the stiffening rod may clear the tapered bore, as indicated by 12 in FIGURE 9. Also, the extended portion of the stiffening rod may taper to a greater extent than the bore 8, so that the extremity of the stiffening rod clears the walls of the bore, as indicated by 13 in FIGURE 10. This condition exists, of course, only when the fishing rod is not flexed. After a nominal minimum flexure, the tip of the stiffening rod bears against the walls of the butt section to form its stiffening function. In this arrangement, it may be desirable to provide a soft plug 14, the outer end of which is slightly larger than the stiffening rod, to avoid any rattling of the stiffening rod within the fishing rod.

The stiffening rod is inserted, virtually its entire length, within the butt section 1 of the fishing rod. The butt extremity of the stiffening rod is provided with a handle 15, which may be of cork or rubber, said handle having a transverse dimension greater than that of the butt end of the bore, so that the handle will always be exposed for grasping.

Operation of the fishing rod is as follows:

It has been discovered by sport fishermen that many fish, including the larger ocean fish, may be taken by an extension of the fly casting technique previously employed principally in fresh water, lake, and stream fishing, for comparatively small fish. The fishing rod, separate from the stiffening rod, is designed to have a high degree of flexibility, so as to be suitable for the fly casting technique. The size of the fly and the hook is commensurate with the size or type of fish to be taken. Initially, the fishing rod is used without the stiffener. When a fish has taken the fly, the fish may be played initially with the fishing rod in its initial condition. When the flexibility of the fishing rod becomes detrimental to the successful handling of the fish, the stiffening rod is thrust into the fishing rod, and the action continues until the fish is brought to gaff.

While a particular embodiment of this invention has been shown and described, it is not intended to limit the same to the details of the construction set forth, but instead, the invention embraces such changes, modifications and equivalents of the various parts and their relationships as come within the purview of the invention.

I claim:
1. A fishing rod comprising:
   (a) a flexible tapered rod structure forming a tapered bore and having a butt end and a tip end, the butt end of the bore being open and larger than the bore at the tip end;
   (b) a removable flexible stiffening rod substantially half the length of said rod structure, said stiffening rod being insertable within the bore from the butt end while the rod structure is in use and having a tapered outer surface engageable with the walls of said bore to increase the stiffness of said rod structure, and said stiffening rod also being removable therefrom from the butt end while said rod structure is in use to reduce the effective stiffness thereof; and
   (c) a handle secured to the butt end of said stiffening rod, said handle having a transverse dimension greater than the transverse dimension of said bore at the butt end.
2. A fishing rod, as defined in claim 1, wherein:
   (a) said stiffening rod conforms substantially to the walls of said bore throughout the length of said stiffening rod.
3. A fishing rod, as defined in claim 1, wherein:
   (a) said stiffening rod engages the walls of said bore at both its extremities and clears said walls intermediate its ends.
4. A fishing rod, as defined in claim 1, wherein:
   (a) said stiffening rod clears the walls of said bore at its tip end.
5. A fishing rod, as defined in claim 4, wherein:
   (a) said stiffening rod is provided with a sound minimizing cushion at its extended end.
6. A fishing rod, as defined in claim 1, wherein:
   (a) said rod structure is divided into at least two sections having telescoping ends; and
   (b) said stiffening rod extends into said telescoping ends.
7. A fishing rod, as defined in claim 1, wherein:
   (a) said rod structure is divided into at least two sections having telescoping ends; and
   (b) said stiffening rod terminates short of said telescoping ends.
8. A fishing rod, as defined in claim 1, wherein:
   (a) said rod structure is divided into at least two sections having telescoping ends; and
   (b) said stiffener rod extends into the vicinity of at least the first connection between said sections.

References Cited

UNITED STATES PATENTS

| | | | |
|---|---|---|---|
| 395,931 | 1/1889 | Treadway | 43—18 |
| 828,557 | 8/1906 | Levison | 43—23 |
| 1,001,326 | 8/1911 | Upton | 43—23 |
| 1,494,530 | 5/1924 | Cook | 43—18 |
| 3,310,903 | 3/1967 | Binvignat | 43—23 |

SAMUEL KOREN, *Primary Examiner.*

J. H. CZERWONKY, *Assistant Examiner.*

U.S. Cl. X.R.

43—212